United States Patent
Gadepalli et al.

(10) Patent No.: US 11,113,144 B1
(45) Date of Patent: Sep. 7, 2021

(54) METHOD AND SYSTEM FOR PREDICTING AND MITIGATING FAILURES IN VDI SYSTEM

(71) Applicant: Wipro Limited, Bangalore (IN)

(72) Inventors: Satya Sairam Gadepalli, Hyderabad (IN); Seshu Venkata Gudepu, Hyderabad (IN); Narsimha Sekhar Kakaraparthi, Hyderabad (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 17/010,873

(22) Filed: Sep. 3, 2020

(30) Foreign Application Priority Data

May 31, 2020 (IN) .............................. 202041022820

(51) Int. Cl.
*G06F 11/07* (2006.01)
*G06F 9/455* (2018.01)
*G06N 20/00* (2019.01)

(52) U.S. Cl.
CPC ...... *G06F 11/0793* (2013.01); *G06F 9/45558* (2013.01); *G06F 11/079* (2013.01); *G06F 11/0712* (2013.01); *G06F 11/0751* (2013.01); *G06F 11/0778* (2013.01); *G06N 20/00* (2019.01); *G06F 2009/45591* (2013.01)

(58) Field of Classification Search
CPC ............. G06F 11/0793; G06F 11/0712; G06F 11/0751; G06F 11/0778; G06F 11/079; G06F 9/45558; G06F 2009/45591; G06N 20/00

See application file for complete search history.

(56) References Cited

U.S. PATENT DOCUMENTS

| 10,289,509 B2 | 5/2019 | Xu et al. |
| 2016/0112285 A1* | 4/2016 | Kim ............ H04L 41/069 709/224 |
| 2018/0176241 A1* | 6/2018 | Manadhata ...... H04L 63/1425 |

(Continued)

OTHER PUBLICATIONS

VRealize Log Insight, https://www.vmware.com/in/products/vrealize-log-insight.html, VMware 2020, 5 pages.

(Continued)

*Primary Examiner* — Matthew M Kim
*Assistant Examiner* — Matthew N Putaraksa
(74) *Attorney, Agent, or Firm* — Finnegan, Henderson, Farabow, Garrett & Dunner, LLP

(57) ABSTRACT

The present disclosure relates to a method and system for predicting and mitigating failures in Virtual Desktop Infrastructure (VDI) systems. System logs is received from VDI systems. Error logs are segregated from the system logs. A prediction score is generated based on the error logs. A failure is predicted in VDI systems based on the prediction score and the error logs using a trained machine learning model. A response action associated with the predicted failure is determined. Training the machine learning model comprises receiving feature vectors associated with training error logs and one or more rules. Further, the training comprises determining a failure and a value based on the feature vectors and the one or more rules. Also, the training comprises determining a correlation between the one or more rules, the determined failure and the feature vectors.

25 Claims, 9 Drawing Sheets

(56) References Cited

U.S. PATENT DOCUMENTS

| | | | |
|---|---|---|---|
| 2019/0163609 A1* | 5/2019 | Rabasco | G06F 16/23 |
| 2019/0377623 A1* | 12/2019 | Ramachandran | G06N 20/00 |
| 2019/0377625 A1* | 12/2019 | Chintalapati | G06F 9/45558 |
| 2020/0026538 A1* | 1/2020 | Cui | G06N 7/005 |
| 2020/0034270 A1* | 1/2020 | Desai | G06K 9/6248 |
| 2021/0006472 A1* | 1/2021 | Khaspa | H04L 43/0876 |
| 2021/0027205 A1* | 1/2021 | Sevakula | G06F 11/327 |
| 2021/0103458 A1* | 4/2021 | Manousakis | G06F 1/324 |

OTHER PUBLICATIONS

Ghazi, S., "Virtual Machine (VM) Earlier Failure Prediction Algorithm", Semantic Scholar 2017, 3 pages.

\* cited by examiner

| Parameter | Critical | | Warning | | Healthy | |
|---|---|---|---|---|---|---|
| | Standard | Custom | Standard | Custom | Standard | Custom |
| Unregistered Desktops | > 25 % | > 25 % | b/w 10-25 % | b/w 10-25 % | < 10 % | < 10 % |
| Overloaded App Servers | > 95 % | > 95 % | b/w 90-95 % | b/w 90-95 % | < 90 % / NO Overloaded Servers | < 90 % |
| Connection Failures | > 25 % | > 25 % | b/w 10-25 % | b/w 10-25 % | < 10 % / NO Connection Fails | 10 % |
| Maintenance Desktops | > 25 % | > 25 % | b/w 10-25 % | b/w 10-25 % | < 10 % | < 10 % |
| Desktops with Excess Utilization | > 10 % | > 25 % | b/w 5-10 % | b/w 10-25 % | < 5% | < 10 % |
| Failed Machines | > 10 % | > 10 % | b/w 5-10 % | b/w 5-10 % | < 5 % | < 5 % |
| Connection Time (s) | > 120 | > 120 | > 90 | > 90 | < 90 | < 90 |
| Peak CPU (%) | >90 | >90 | >75 | >75 | <75 | <75 |
| Peak used memory (%) | >90 | >90 | >75 | >75 | <75 | <75 |
| Peak Disk IO Latency (ms) | >25 | >25 | >5 | >5 | <5 | <5 |
| Peak Disk IOPS | >100 | >100 | >50 | >50 | <50 | <50 |
| Round Trip Time (ms) | >350 | | 250-350 | | 200 | |
| Latency (ms) | >90 | | 50 | | 10 | |
| Logon Duration (s) | >90 | | 60 | | 30 | |
| Network Latency (ms) | >5 | | 3 | | 1 | |
| App Launch Time (s) | 10-30 | | 3-10 | | 3 | |
| User Input Lag (ms) | 1000 | | 20 | | 26 | |
| Compute: CPU Utilization | <80% (For more than 2 min) | | <60% | | <30% | |

FIGURE 6A

| Timestamp | 1/1/2020 5:00 PM | 1/1/2020 4:00 PM | 1/1/2020 3:00 PM | 1/1/2020 2:00 PM | 1/1/2020 1:00 PM | 1/1/2020 12:00 AM | 1/1/2020 11:00 AM |
|---|---|---|---|---|---|---|---|
| Connection time | 52 sec | 91 sec | 54 sec | 39 sec | 47 sec | 124 sec | 56 sec |
| Failed machines | 0% | 0% | 0% | 0% | 0% | 0% | 0% |
| Desktops with excess utilization | 2% | 3% | 2% | 2% | 2% | 2% | 5% |
| Maintenance desktops | 6% | 6% | 6% | 6% | 6% | 6% | 6% |
| Certificate expiry | 1/1/2021 | 1/1/2021 | 1/1/2021 | 1/1/2021 | 1/1/2021 | 1/1/2021 | 1/1/2021 |
| Connection failures | 3% | 0% | 0% | 5% | 12% | 0% | 0% |
| Overloaded app servers | 1% | 1% | 1% | 1% | 1% | 1% | 1% |

FIGURE 6B

METHOD AND SYSTEM FOR PREDICTING AND MITIGATING FAILURES IN VDI SYSTEM

TECHNICAL FIELD

The present disclosure relates to Virtual Desktop Infrastructure (VDI) management. More particularly, the present disclosure relates to a method and system for predicting and mitigating failures in VDI system.

BACKGROUND

Organizations deploy Virtual Desktop Infrastructure (VDI) to store and retrieve information from a specific data center over the Internet. The VDI provides users in the organizations with improved access to the information. The organizations control data flow occurring in the data center, thereby enhancing security and management of the information. A heterogeneous VDI includes a cluster of various VDI systems that are interconnected with each other in a cloud system. In the heterogenous VDI, different types of VDI systems are set up within different VDI cloud platforms such as public cloud and private cloud. When such large numbers of the VDI systems are deployed in VDI cloud, troubleshooting a particular fault or an issue that arises in the VDI cloud becomes significantly difficult. In particular, when infrastructure failures occur in the VDI systems, they can accumulate and propagate, leading to severe degradation of the VDI systems and application performance.

Traditional techniques for troubleshooting failures in the VDI systems include identifying software/hardware failures in the VDI systems during time of execution. However, in the conventional systems, the troubleshooting process does not identify a root cause of the fault in the VDI systems. The traditional techniques for fault preventions in the VDI systems provide a high number of false alerts. The traditional techniques include real-time monitoring of the failures in the VDI systems. Troubleshooting happens only after the failure has occurred. Hence, there is a delay in the system while overcoming the failures, which degrades the performance of the VDI system.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure discloses a method for predicting and mitigating failures in Virtual Desktop Infrastructure (VDI) system. The method comprises receiving, by a computing system, a plurality of system logs from a plurality of VDI systems. Further, the method comprises segregating, by the computing system, one or more error logs from the plurality of system logs. Furthermore, the method comprises generating, by the computing system, a prediction score for each of the plurality of VDI systems based on respective one or more error logs, using a machine learning model. The prediction score of a VDI system among the plurality of VDI systems is indicative of a possible failure in the VDI system. Training of the machine learning model comprises receiving a plurality of feature vectors associated with a plurality of training error logs and one or more rules. Further, the training of the machine learning model comprises determining a failure in the plurality of VDI systems and a value associated with the plurality of training error logs, based on the plurality of feature vectors and the one or more rules. Also, the training of the machine learning model comprises determining a correlation between the one or more rules, the determined failure and the plurality of feature vectors to train the machine learning model. The trained machine learning model is used to predict failures in the plurality of VDI systems in real-time. Moreover, the method comprises predicting, by the computing system, a failure in at least one VDI system from the plurality of VDI systems based on the prediction score of the at least one VDI system and the respective one or more error logs using the trained machine learning model. Thereafter, the method comprises determining, by the computing system, at least one response action associated with the predicted failure, thereby mitigating the failure in the plurality of VDI systems.

In an embodiment, the present disclosure discloses a computing system for predicting and mitigating failures in Virtual Desktop Infrastructure (VDI) system. The computing system comprises one or more processors and a memory. The one or more processors are configured to receive a plurality of system logs from a plurality of VDI systems. Further, the one or more processors are configured to segregate one or more error logs from the plurality of system logs. Furthermore, the one or more processors are configured to generate a prediction score for each of the plurality of VDI systems based on respective one or more error logs, using a machine learning model. The prediction score of a VDI system among the plurality of VDI systems is indicative of a possible failure in the VDI system. Training of the machine learning model comprises receiving a plurality of feature vectors associated with a plurality of training error logs and one or more rules. Further, the training of the machine learning model comprises determining a failure in the plurality of VDI systems and a value associated with the plurality of training error logs, based on the plurality of feature vectors and the one or more rules. Also, the training of the machine learning model comprises determining a correlation between the one or more rules, the determined failure, and the plurality of feature vectors to train the machine learning model. The trained machine learning model is used to predict failures in the plurality of VDI systems in real-time. Moreover, the one or more processors are configured to predict a failure in at least one VDI system from the plurality of VDI systems based on the prediction score of the at least one VDI system and the respective one or more error logs using the trained machine learning model. Thereafter, the one or more processors are configured to determine at least one response action associated with the predicted failure, thereby mitigating the failure in the plurality of VDI systems.

In an embodiment, the present disclosure discloses a non-transitory computer readable medium including instructions stored thereon that when processed by one or more processors cause a computing system to predict and mitigate failures in Virtual Desktop Infrastructure (VDI) system. The computing system comprises one or more processors and a memory. The one or more processors are configured to receive a plurality of system logs from a plurality of VDI systems. Further, the one or more processors are configured to segregate one or more error logs from the plurality of system logs. Furthermore, the one or more processors are configured to generate a prediction score for each of the plurality of VDI systems based on respective one or more error logs, using a machine learning model. The prediction score of a VDI system among the plurality of VDI systems is indicative of a possible failure in the VDI system. Training of the machine learning model comprises receiving a plurality of feature vectors associated with a plurality of training error logs and one or more rules. Further, the training of the machine learning model comprises determining a failure in the plurality of VDI systems and a value associated with the plurality of training error logs, based on the plurality of feature vectors and the one or more rules. Also, the training of the machine learning model comprises determining a correlation between the one or more rules, the determined failure, and the plurality of feature vectors to train the machine learning model. The trained machine learning model is used to predict failures in the plurality of VDI systems in real-time. Moreover, the one or more processors are configured to predict a failure in at least one VDI system from the plurality of VDI systems based on the prediction score of the at least one VDI system and the respective one or more error logs using the trained machine learning model. Thereafter, the one or more processors are configured to determine at least one response action associated with the predicted failure, thereby mitigating the failure in the plurality of VDI systems.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristics of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

FIGS. 6A, 6B and 6C shows exemplary illustrations of predicting and mitigating failures in the VDI system, in accordance with some embodiments of the present disclosure;

Figure 1:
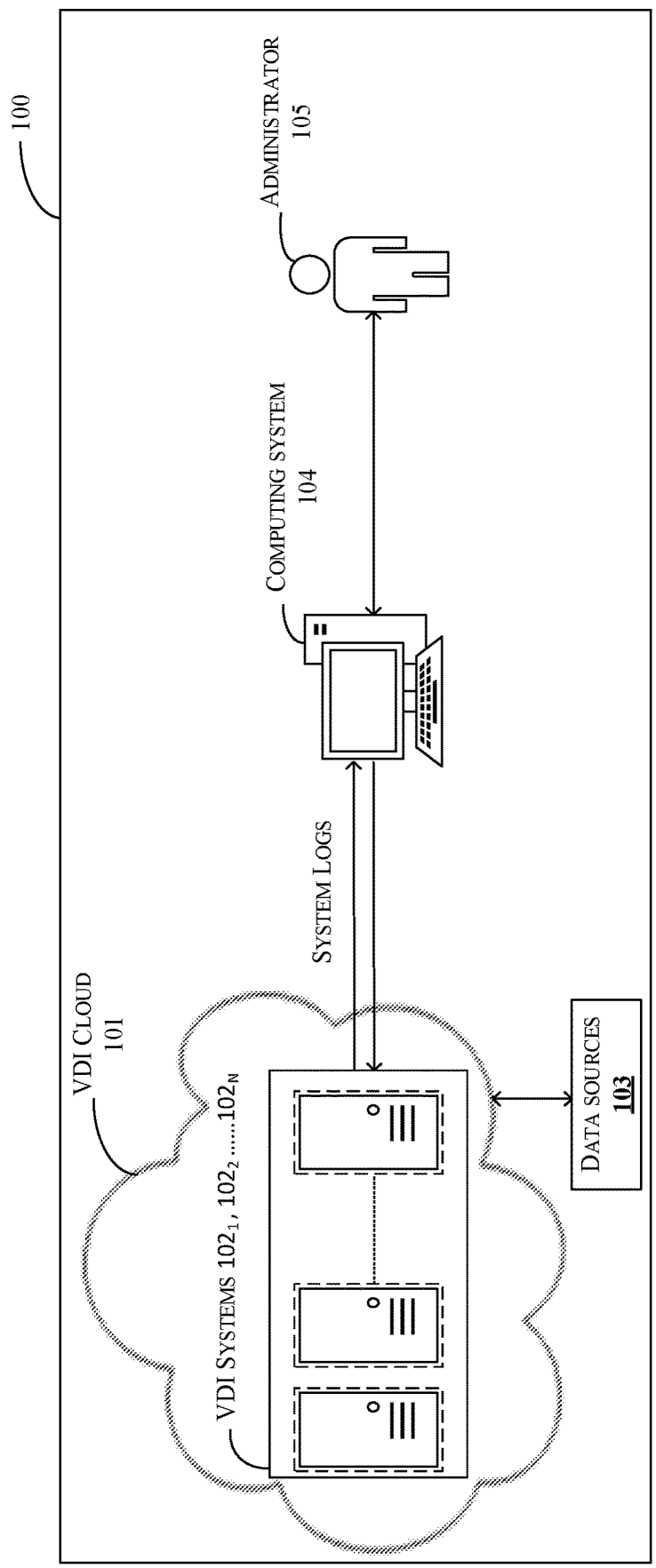
FIG. 1 shows an exemplary environment illustrating prediction and mitigation of failures in Virtual Desktop Infrastructure (VDI) system, in accordance with some embodiments of the present disclosure.

It should be appreciated by those skilled in the art that any block diagram herein represents conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to predicting and mitigating failures in Virtual Desktop Infrastructure (VDI) system. A machine learning model is used to predict failures in the VDI systems. During training of the machine leaning model, a plurality of training error logs, feature vectors associated with the plurality of training error logs and one or more rules are provided as input, for determining the failure in the plurality of training error logs. Further, the machine learning model determines a correlation between the one or more rules, the determined failure, and the plurality of feature vectors. This enhances the training of the machine learning model. The trained machine learning model is used to predict failures in the plurality of VDI systems in real-time. A plurality of system logs is received from a plurality of VDI systems in real-time. The system logs may comprise one or more error logs. The one or more error logs are segregated from the plurality of system logs. A prediction score that indicates a possible failure in the VDI system is generated for each of the plurality of VDI systems based on respective one or more error logs using a machine learning model. The machine learning model is trained to determine a failure in the plurality of VDI systems and to determine a value associated with the plurality of training error logs. Also, at least one response action associated with the predicted failure is determined. Determination of the response actions assists administrators to mitigate the failure in the plurality of VDI systems. Thus, the failure in the VDI systems are predicted before an actual failure occurrence, unlike conventional systems where real-time monitoring of the failures causes delay in the system.

FIG. 1 shows an exemplary environment (100) illustrating prediction and mitigation of failures in the VDI systems. The environment (100) comprises a VDI cloud (101), a plurality of VDI systems ($102_1$, $102_2$, ..., $102_n$), data sources (103), a computing system (104) and an administrator (105). The VDI cloud (101) enables remote desktop virtualization via cloud computing technology. For example, the VDI cloud (101) is a Citrix® Cloud™. The plurality of VDI systems ($102_1$, $102_2$, ..., $102_n$) may reside in the VDI cloud (101). In the present disclosure, a heterogenous VDI architecture is considered for predicting and mitigating failures. A person skilled in the art will appreciate that other VDI architectures may be considered, and the present disclosure is not limited to heterogenous VDI architecture. In the heterogenous VDI architecture, the plurality of VDI systems ($102_1$, $102_2$, ..., $102_n$) of different types may be operated simultaneously. The different types of the plurality of VDI systems ($102_1$, $102_2$, ..., $102_n$) may be virtual applications, virtual desktops, gateways, content collaboration, application delivery management, application layering, secure browser, intelligent traffic management, analytics, workspace environment manager and the like. Each VDI system of the plurality of VDI systems ($102_1$, $102_2$, ..., $102_n$) may have a plurality of system logs in different formats, which are created and maintained by the VDI system in form of text files. The data sources (103) provides data storage for the plurality of VDI systems ($102_1$, $102_2$, ..., $102_n$) working in the VDI cloud (101). The data sources (103) comprises a repository (not shown in FIG. 1). The repository may comprise many databases (in detail explanation in FIG. 2). The data sources (103) connects to hypervisors and cloud infrastructures. The hypervisors present in the data sources may host the VDI cloud (101) and the plurality of VDI systems ($102_1$, $102_2$, ..., $102_n$) are deployed in the VDI cloud (101). The cloud infrastructures may be a public cloud, a private cloud, or a hybrid cloud. For example, the cloud infrastructure may be Amazon® Web Services™ (AWS), Microsoft® Azure®, Google® Cloud™, Oracle® Cloud, IBM® Cloud™, Microsoft® Hyper-V™, VMware® ESXi™, Citrix® Hypervisor™ and Nutanix® AHV™. The computing system (104) may receive the plurality of system logs and may segregate one or more error logs from the plurality of system logs. The computing system (104) may predict failures in the plurality of VDI systems ($102_1$, $102_2$, ..., $102_n$) based on the one or more error logs. The administrator (105) may develop, configure, implement, and manage the plurality of VDI systems ($102_1$, $102_2$, ..., $102_n$). There may be one or more administrators at different levels of management. The administrator (105) may be a data center network administrator, a domain administrator, and the like. The computing system (104) may determine at least one response action for the predicted failure and may provide the at least one determined response action as an alert to the administrator (105) for mitigating the failure.

Figure 2:
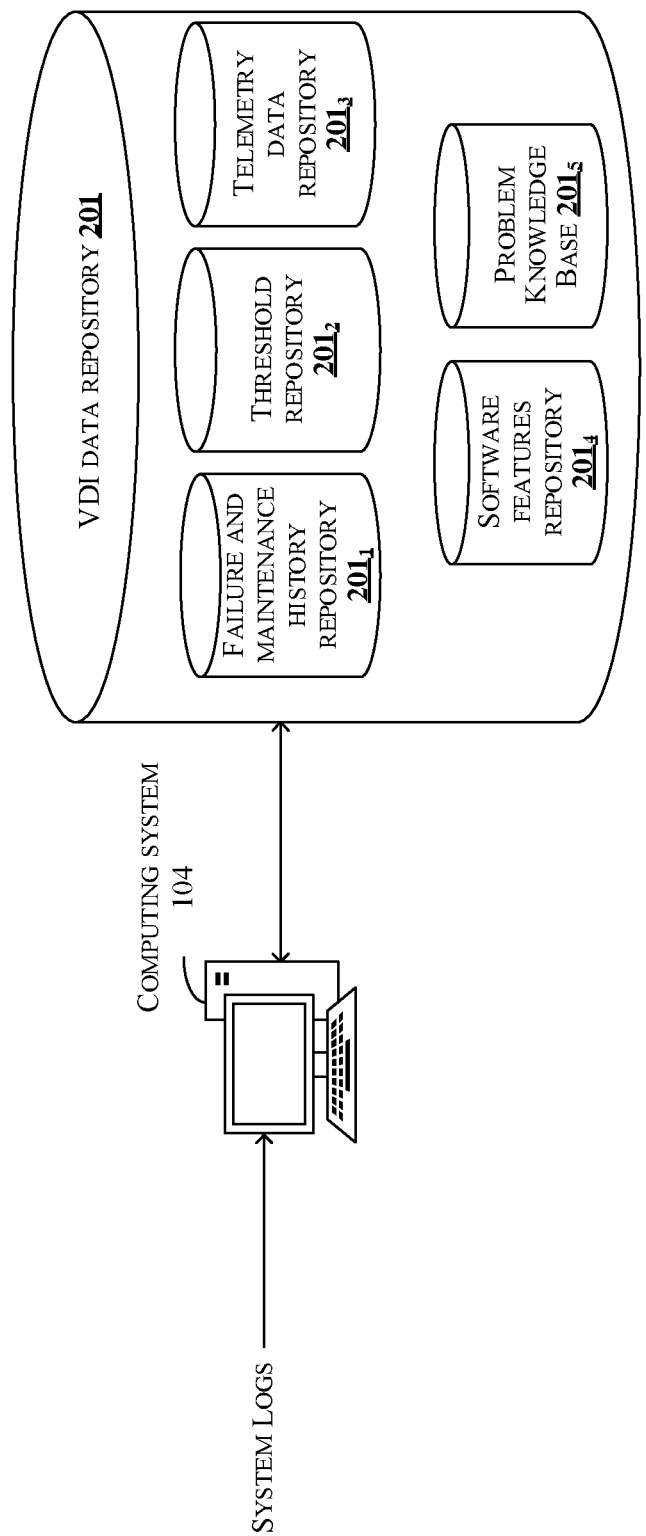
FIG. 2 shows an exemplary VDI data repository used for predicting and mitigating failures in the VDI system, in accordance with some embodiments of the present disclosure.

FIG. 2 shows exemplary VDI data repository (201) used by the computing system (104) for predicting and mitigating failures in the plurality of VDI systems ($102_1$, $102_2$, ..., $102_n$). As shown, the VDI data repository (201) may comprise, but not limited to, a failure and maintenance history repository ($201_1$), a threshold repository ($201_2$), a telemetry data repository ($201_3$), a software features repository ($201_4$) and a problem knowledge base ($201_5$). The failure and maintenance history repository ($201_1$) may store data related to historical failure events. The data may comprise knowledge of failures, failure symptoms, failure detection mechanisms, failure diagnosis, root causes of failures, failure classifications, probable mitigation steps and the like. The computing system (104) may use the data to predict the failures in the plurality of VDI systems ($102_1$, $102_2$, ..., $102_n$). The threshold repository ($201_2$) may comprise various threshold values for various parameters in the one or more error logs using which the computing system (104) may compare the one or more error logs with the historical failure events. The telemetry data repository ($201_3$) may comprise automatic recording and transmission data received from remote sources and is used for monitoring and analysis of the data. The telemetry data repository ($201_3$) in the VDI may hold compute data, storage, and network data. The software features repository ($201_4$) may store software feature data of VDI components and mapping data associated with user actions. For example, the mapping data associated with the user actions may be provisioning, de-provisioning of applications. The software feature data of the VDI components may be Central Processing Unit (CPU) usage. The problem knowledge base ($201_5$) may comprise a list of problems with appropriate response actions. A response action may be to modify system parameters, modify detect parameter thresholds, provision additional resources, ignore and inform administrators, and the like. The detect parameter thresholds may be a threshold value used to determine the failures. One or more repositories from the VDI data repository may reside in the computing system (104). For example, the failure and maintenance history repository ($201_1$) may reside in the computing system (104). Some other repositories may reside in the VDI cloud (101). For example, the telemetry data repository ($201_3$) may reside in the VDI cloud (101). In an embodiment, there may be a single repository storing historical failure data, threshold data, telemetry data, the software feature data and the response actions.

Figure 3:
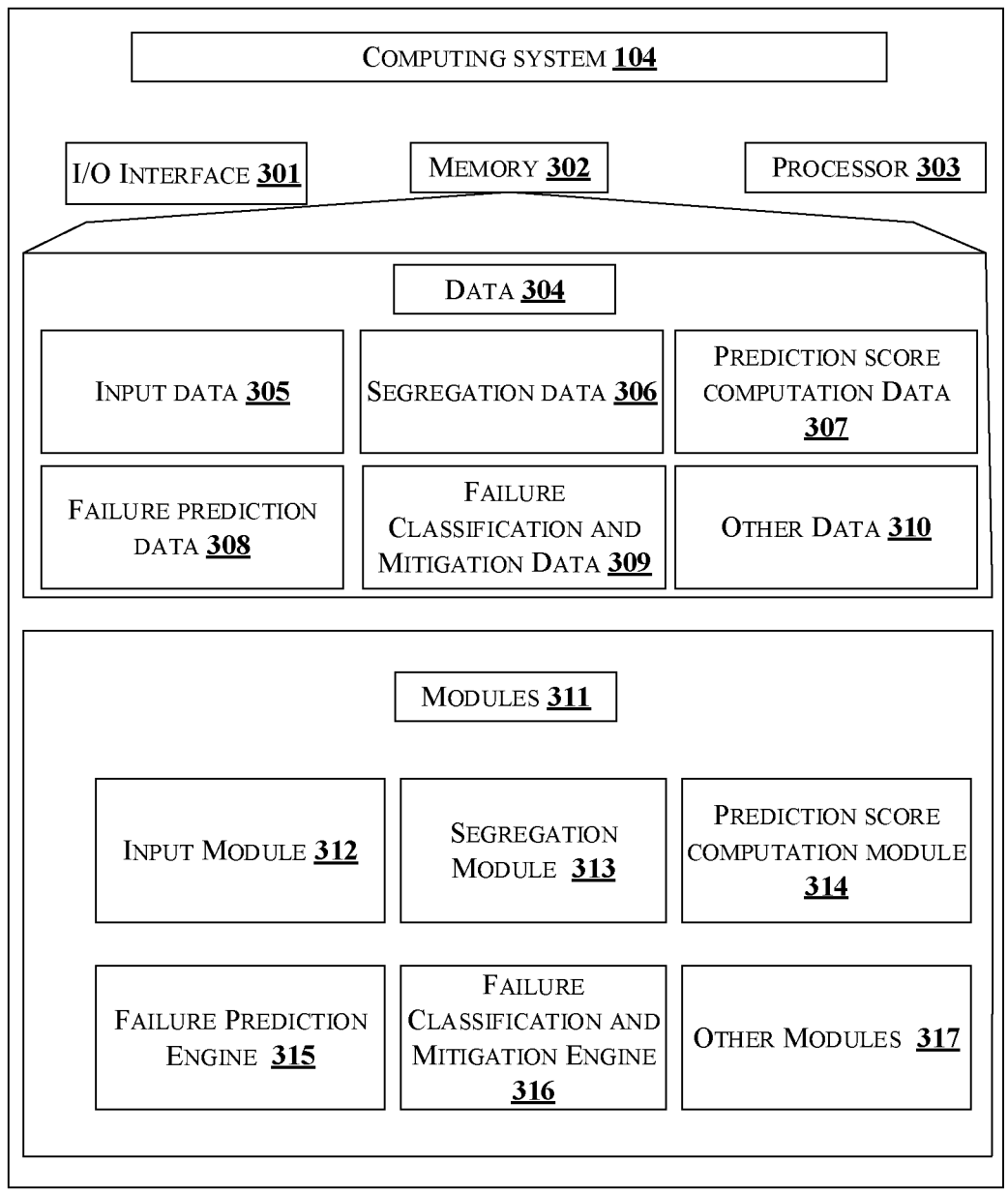
FIG. 3 shows an internal architecture of a computing system for predicting and mitigating failures in the VDI system, in accordance with some embodiments of the present disclosure.

FIG. 3 illustrates internal architecture of the computing system (104) in accordance with some embodiments of the present disclosure. The computing system (104) may include at least one Central Processing Unit ("CPU" or "processor") (303) and a memory (302) storing instructions executable by the at least one processor (303). The processor (303) may comprise at least one data processor for executing program components for executing user or system-generated requests. The memory (302) is communicatively coupled to the processor (303). The computing system (104) further comprises an Input/Output (I/O) interface (201). The I/O interface (201) is coupled with the processor (303) through which an input signal or/and an output signal is communicated.

In an embodiment, data (304) may be stored within the memory (302). The data (304) may include, for example, input data (305), segregation data (306), prediction score computation data (307), failure prediction data (308), failure classification and mitigation data (309) and other data (310).

In an embodiment, the input data (305) may comprise a plurality of system logs received from the plurality of VDI systems ($102_1$, $102_2$, ..., $102_n$). The plurality of system logs may be created and maintained by an operating system of each of the plurality of VDI systems ($102_1$, $102_2$, ..., $102_n$). The plurality of system logs may comprise a list of operations that the plurality of VDI systems ($102_1$, $102_2$, ..., $102_n$) may have performed.

In an embodiment, the segregation data (306) may comprise one or more error logs segregated from the plurality of system logs. The plurality of system logs may comprise the one or more error logs which are logged when there is an error. For example, the error may be a connection loss, a high load time and response time, and the like. The one or more error logs may be segregated from the plurality of system logs by comparing the plurality of system logs with the VDI data repository (201) comprising the plurality of training error logs. Segregation of the one or more error logs from the plurality of system logs enables resource utilization because it will reduce search space data in which the computing system (104) predicts the failure and thereby reduces time to predict the failure. Further, the segregation data (306) may comprise aggregated error logs. The one or more error logs may be aggregated in a time-sequence format based on a timestamp associated with the one or more error logs. Aggregating the one or more error logs enables correlation of events associated with the plurality of VDI systems ($102_1, 102_2, \ldots, 102_n$).

In an embodiment, the prediction score computation data (307) may comprise a value associated with the plurality of training error logs. Further, the prediction score computation data (307) may comprise the prediction score generated for each of the plurality of the VDI systems ($102_1, 102_2, \ldots, 102_n$). The prediction score of a VDI system ($102_1$) among the plurality of VDI systems ($102_1, 102_2, \ldots, 102_n$) is indicative of a possible failure in the VDI system ($102_1$).

In an embodiment, the failure prediction data (308) may comprise a plurality of feature vectors associated with the plurality of training error logs, one or more rules for training the machine learning model. Further, the failure prediction data (308) may comprise data related to a correlation between the one or more rules, the determined failure, and the plurality of feature vectors.

In an embodiment, the failure classification and mitigation data (309) may comprise data related to classification of the failure to a problem from a list of the problems in the problem knowledge base ($201_5$).

In an embodiment, the other data (310) may comprise feedback data for retraining/fine-tuning a machine learning model to predict the failures in the plurality of VDI systems ($102_1, 102_2, \ldots, 102_n$).

In an embodiment, the data (304) in the memory (302) may be processed by modules (311) of the computing system (104). As used herein, the term modules (311) refers to an Application Specific Integrated Circuit (ASIC), an electronic circuit, a Field-Programmable Gate Arrays (FPGA), a Programmable System-on-Chip (PSoC), a combinational logic circuit, and/or other suitable components that provide the described functionality. The modules (311) when configured with the functionality defined in the present disclosure will result in a novel hardware.

In one implementation, the modules (311) may include, for example, an input module (312), a segregation module (313), a prediction score computation module (314), a failure prediction engine (315), a failure classification and mitigation engine (316), and other modules (318). It will be appreciated that such aforementioned modules (311) may be represented as a single module or a combination of different modules.

In an embodiment, the input module (312) may receive the plurality of system logs from the plurality of VDI systems ($102_1, 102_2, \ldots, 102_n$). Further, the input module (312) may receive data from the plurality of VDI systems ($102_1, 102_2, \ldots, 102_n$), for example, the telemetry data. In an embodiment, the input module (312) may receive the training error logs, the feature vectors and the one or more rules for training the machine learning model.

In an embodiment, the segregation module (313) may segregate the one or more error logs from the plurality of system logs. The segregation module (313) may parse the plurality of system logs into a structured data sequence. The segregation module (313) may parse each piece of alphanumeric data within each system log into a number/sequence of tokens using a defined set of delimiters. The delimiters may be spaces, equal signs, colons, semicolons, and the like. The segregation module (313) may identify the one or more error logs by comparing the structured data sequence with the VDI data repository (201) comprising the plurality of training error logs. Further, the segregation module (313) may aggregate the one or more error logs in a time-sequence format based on a timestamp associated with the one or more error logs.

In an embodiment, the prediction score computation module (314) may receive the plurality of training error logs from the input module (312). Further, the prediction score computation module (307) may compute a value associated with the plurality of training error logs, during training the machine learning model. The prediction score computation module (314) may compare the one or more error logs with the VDI data repository (201) to generate the prediction score. The prediction score represents a probability of occurrence of the failure. For example, the prediction score may be generated on a scale 1-10. The prediction score 1 may indicate a least probability and the prediction score 10 may indicate a high probability. For example, a parameter of the one or more error logs with the prediction score 1 may be least likely to cause failure. Likewise, a parameter of the one or more error logs with the prediction score 10 may be most likely to cause failure. The probable failure occurrence time may be 3 months when the prediction score is 3. The probable failure occurrence time may be 1 week when the prediction score is 8.

In an embodiment, the failure prediction engine (315) may determine the failure in the plurality of VDI systems ($102_1, 102_2, \ldots, 102_n$) based on the plurality of feature vectors associated with the plurality of training error logs and the one or more rules. The plurality of feature vectors may be extracted based on patterns in the one or more logs. The plurality of feature vectors are generated using techniques such as word-to-vector algorithms. The plurality of training logs may be labelled based on the plurality of feature vectors. For example, the training error logs may be labelled as erroneous or normal based on the plurality of feature vectors. The labelled training error logs is used by the machine learning model to predict the failure. The one or more rules may be pre-determined or may be dynamically generated in real-time. For example, the one or more rules may be an error which does not lead to a failure. Hence, the machine learning model may ignore the error when predicting the failure to reduce false alerts. Further, the one or more rules may be conditions based on various thresholds for considering the error as the failure. For example, consider there are 3 errors in a VDI system ($102_1$). A first error may persist for a time period greater than a threshold time. According to the one or more rules, the first error may lead to the failure. However, a second and a third error may not persist for a time period greater than the threshold time. Hence, the second error and the third error may not cause the failure. Further, the failure prediction engine (315) may determine a correlation between the one or more rules, the determined failure, and the plurality of feature vectors. The machine learning model may learn to determine the failure in real-time based on the correlation. In an embodiment, the correlation may help in determining how the failures vary based on the plurality of feature vectors and the one or more rules. Hence, weights and bias are provided to the inputs based on the correlation to improve accuracy of the prediction. For example, auto correlation or cross correlation may be used. A person skilled in art will appreciate that any known co-relation algorithms can be used to determine a correlation between input provided to a machine learning model and output provided by the machine learning model.

In an embodiment, the failure classification and mitigation engine (316) may classify the predicted failure to a problem from the list of the problems in the problem knowledge base ($201_5$). For example, the predicted failure may be provisioning of an application is consuming lot of time. The problem may be related to storage. Further, the failure classification and mitigation engine (316) may determine at least one response action associated with the problem. The response actions may be determined from the VDI data repository (201). For example, the response action may be to create disk space by removing unwanted files. The problem and the associated response action may be determined in real-time. For example, the failure prediction engine (315) may have predicted multiple requests before launch of an application. Hence, problem may be related to capacity. The response action may be to increase capacity.

In an embodiment, the other modules (218) may comprise a display unit, an alarm unit, and the like to provide an alert to the administrator (105). The display unit may display at least one response actions. The alarm unit may generate an alarm to indicate a severe failure of a VDI system ($102_1$).

Figure 4:
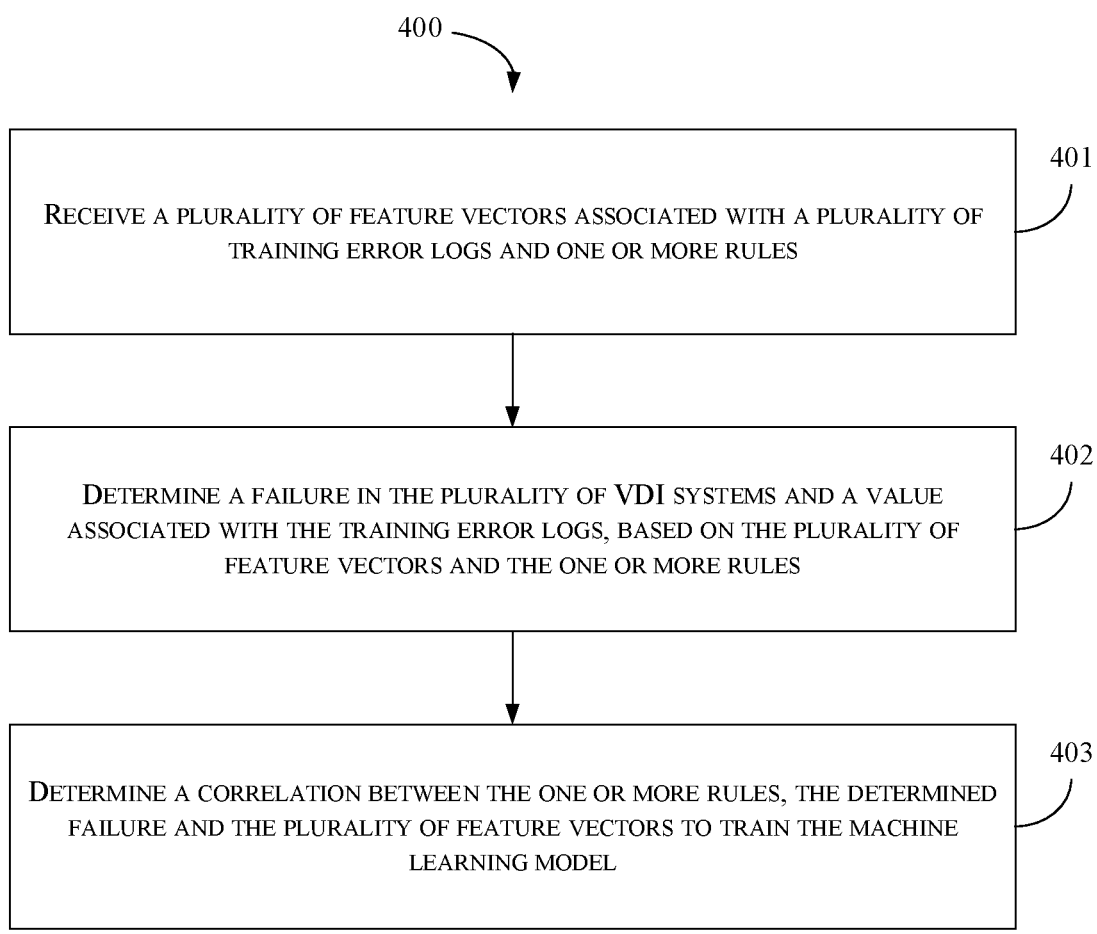
FIG. 4 shows an exemplary flow chart illustrating method steps for training a machine learning model to predict and mitigate failures in the VDI system, in accordance with some embodiments of the present disclosure.

FIG. 4 shows an exemplary flow chart illustrating method steps for training the machine learning model to predict and mitigate failures in the plurality of VDI systems ($102_1$, $102_2$, ..., $102_n$), in accordance with some embodiments of the present disclosure. As illustrated in FIG. 4, the method (400) may comprise one or more steps. The method (400) may be described in the general context of computer executable instructions. Generally, computer executable instructions can include routines, programs, objects, components, data structures, procedures, modules, and functions, which perform particular functions or implement particular abstract data types.

The order in which the method (400) is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At step (401), receiving the plurality of feature vectors associated with the plurality of training error logs and the one or more rules. The computing system (104) may receive the plurality of feature vectors associated with the plurality of training error logs. The plurality of feature vectors may be extracted based on patterns in the one or more logs. The plurality of feature vectors associated with the one or more error logs are generated using techniques such as word-to-vector algorithms. The plurality of training error logs may be labelled as normal and abnormal. When the machine learning model makes prediction, administrator will know whether the machine learning model has predicted the failure correctly or not. Labelling may be performed using the machine learning model or manually. For example, when historical data is collected, the one or more error logs are manually segregated and are labelled as abnormal data. In an embodiment, the machine learning model may be trained using supervised, semi-supervised or unsupervised techniques. Further, the computing system (104) may receive the one or more rules. The one or more rules may be pre-determined or may be dynamically generated in real-time. For example, the one or more rules may be an error which does not lead to a failure. Hence, the machine learning model may ignore the error when predicting the failure to reduce false alerts. Further, the one or more rules may be various thresholds for considering the error as the failure. For example, consider an error in an application installed in a VDI system which affects response time of the VDI system to other applications. The VDI system may take a longer time to respond, since the application may consume additional memory while loading and release the memory after the application is loaded. This error may necessarily not be a failure. In another example, consider an error in an application installed in which affects response time of all the VDI systems to other applications. All the VDI systems may take a longer time to respond, since the application may consume additional memory while loading and release the memory after the application is loaded. This error may be considered as a failure. Further, the machine learning model may be trained by providing state data of software services and hardware assets associated with the plurality of VDI systems ($102_1$, $102_2$, ..., $102_n$). For example, the state data of the software services is provisioning, de-provisioning, launching, normal usage by the user at the user-end. The state data of the hardware assets may be associated metrics like ambient temperatures of CPUs, disks, power supplies and the like. The state data of the software services and the hardware assets are provided to see if there are any overloading or malfunctioning conditions in either software or hardware that results in excessive utilization of resources like CPU, disk spins and higher power consumption resulting in potential hardware components failure.

At step (402), determining the failure in the plurality of VDI systems ($102_1$, $102_2$, ..., $102_n$) and the value associated with the plurality of training error logs, based on the plurality of feature vectors and the one or more rules. A Long Short-Term Memory (LSTM) network may be used to train the machine learning model to determine or predict failure in the plurality of VDI systems ($102_1$, $102_2$, ..., $102_n$) by using the plurality of feature vectors of the plurality of training error logs. A person skilled in the art will appreciate that other sequence neural networks may be used. The computing system (104) may determine the failure based on the plurality of feature vectors. The plurality of training logs may be labelled based on the plurality of feature vectors. For example, the training error logs may be labelled as erroneous or normal based on the plurality of feature vectors. The labelled training error logs is used by the machine learning model to predict the failure Further, the machine learning model determines the failure based on the one or more rules. Referring to the above example, when all the VDI systems are taking a longer time to respond, the computing system (104) may determine this as a failure in the VDI systems. Further, the machine leaning model determines the failure in the plurality of VDI systems ($102_1$, $102_2$, ..., $102_n$) based on the state data of the software services and the hardware assets. The machine learning model finds patterns in the state data, for example, using a deep leaning technique. The metrics associated with the software services and the hardware assets may have various thresholds for determining the failure. The thresholds may be stored in the threshold repository ($201_2$). FIG. 6A shows an exemplary table with various thresholds for determining if the plurality of VDI systems ($102_1$, $102_2$, ..., $102_n$) is in healthy, unhealthy, or critical state is provided. The plurality of training error logs may be labelled. Known class labels may be healthy, unhealthy, and critical states. Based on thresholds of various parameters of the one or more error logs, the failure is classified into the known class labels. From the table, if connection time is less than 90 seconds, the VDI system is classified as the healthy state. If the connection time is greater than 120 seconds, the VDI system is classified as the unhealthy state. If the connection time is greater than 120 seconds, the VDI system is classified as the critical state. FIG. 6B shows an exemplary data of a VDI system from 11.00 AM on Jan. 1, 2020 to 5:00 PM/2020. The data is generated for every hour. Referring to row 1 of the table, the connection time is 124 seconds at 12:00 AM on Jan. 1, 2020, which is classified as the critical state. The connection time is 91 seconds at 4:00 PM on Jan. 1, 2020, which is classified the unhealthy state. Various classification techniques may be used to classify the failures into known class labels. For example, Support Vector Machine (SVM) technique, Naïve Bayes classifier, Decision Trees may be used. A person skilled in art will appreciate that any classification techniques may be used other than the above-mentioned classification techniques.

At step (403), determining a correlation between the one or more rules, the determined failure and the plurality of feature vectors to train the machine learning model. The computing system (104) may determine a correlation between the one or more rules, the determined failure, and the plurality of feature vectors. The machine learning model may learn to determine the failure in real-time based on the correlation. In an embodiment, the correlation may help in determining how the failures vary based on the plurality of feature vectors and the one or more rules. Hence, weights and bias of inputs provided to the machine learning model may be adjusted based on the correlation to improve accuracy of the prediction. For example, service unavailable status on all the plurality of VDI systems ($102_1$, $102_2$, ..., $102_n$) may always lead to a failure. In an embodiment, cross-correlation or auto correlation may be used. A person skilled in art will appreciate that any known correlation techniques can be used to determine a correlation between input provided to a machine learning model and output provided by the machine learning model.

Figure 5:
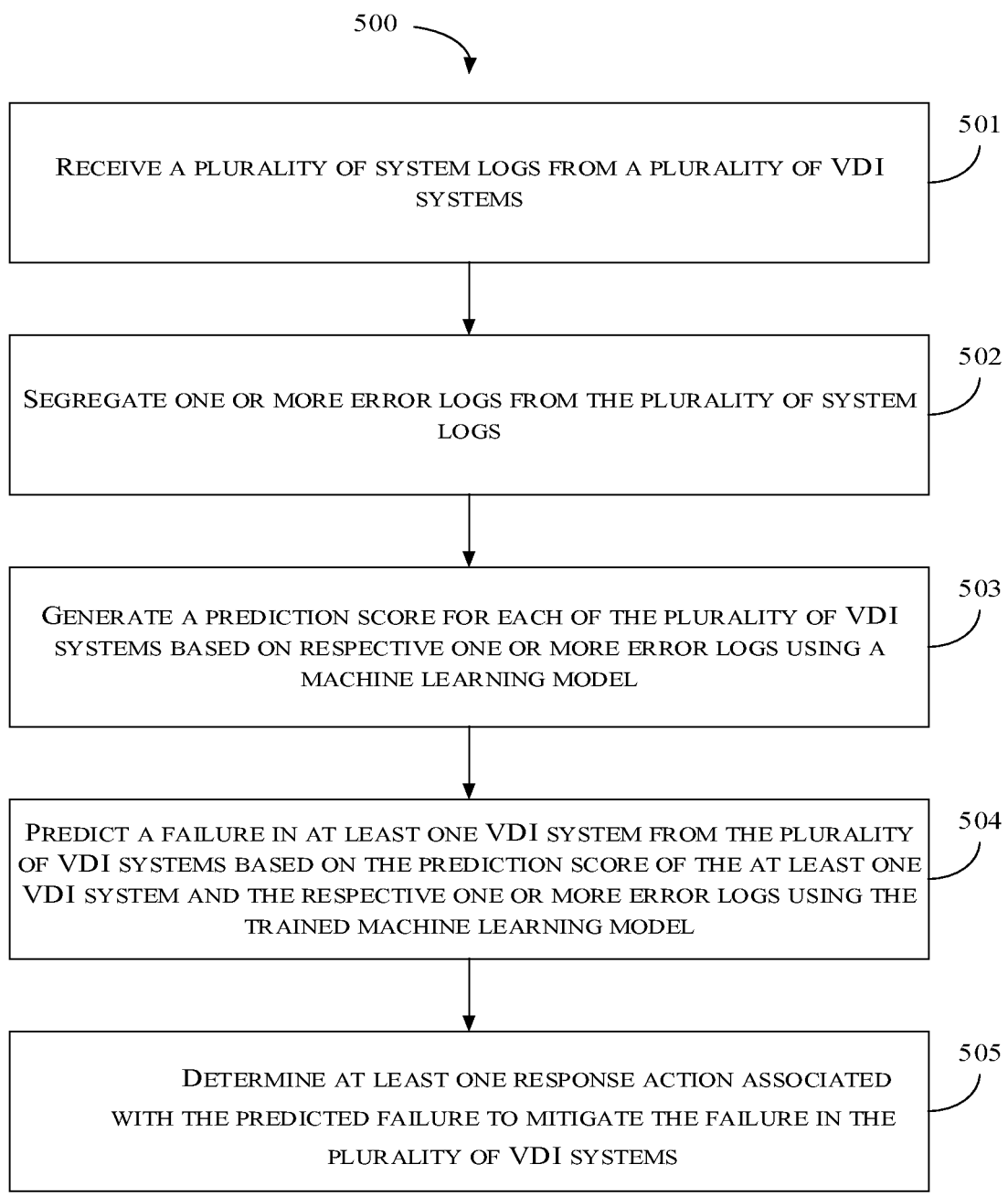
FIG. 5 shows an exemplary flow chart illustrating method steps to predict and mitigate failures in the VDI systems in real-time, in accordance with some embodiments of the present disclosure.

FIG. 5 shows an exemplary flow chart illustrating method steps to predict and mitigate failures in the plurality of VDI systems ($102_1$, $102_2$, ..., $102_n$) in real-time, in accordance with some embodiments of the present disclosure. As illustrated in FIG. 5, the method (500) may comprise one or more steps. The method (500) may be described in the general context of computer executable instructions. Generally, computer executable instructions can include routines, programs, objects, components, data structures, procedures, modules, and functions, which perform particular functions or implement particular abstract data types.

The order in which the method (500) is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

Figure 6C:
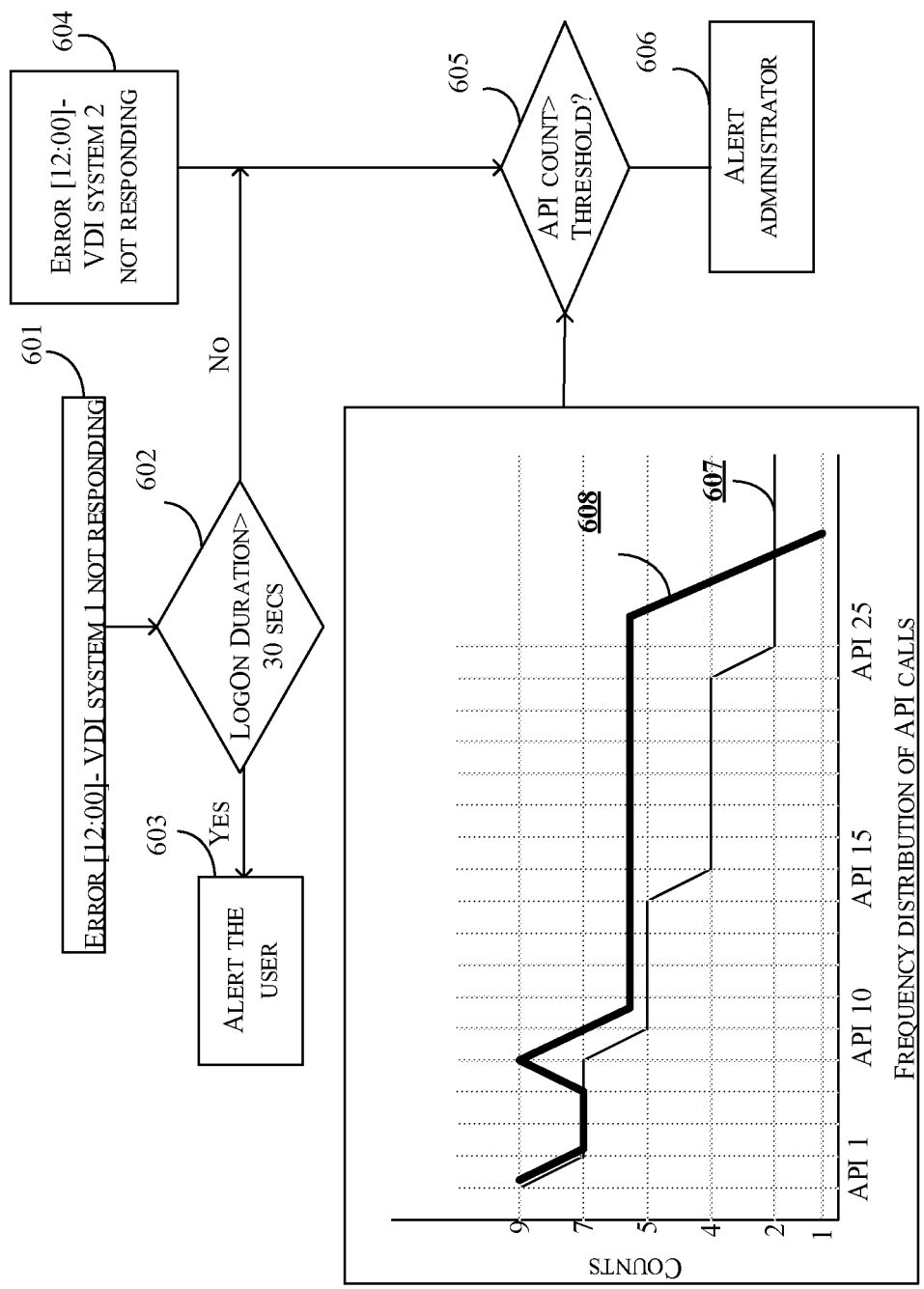

At step (501), receiving, by the computing system (104), the plurality of system logs from the plurality of VDI systems ($102_1$, $102_2$, ..., $102_n$). The plurality of VDI systems ($102_1$, $102_2$, ..., $102_n$) may comprise a plurality of system logs. The plurality of system logs may be created and maintained by operating system of each of the plurality of VDI systems ($102_1$, $102_2$, ..., $102_n$). The plurality of system logs may comprise a list of operations that the plurality of VDI systems ($102_1$, $102_2$, ..., $102_n$) may have performed. FIG. 6C illustrates a launching of a service. The plurality of VDI systems ($102_1$, $102_2$, ..., $102_n$) may receive Application Programming Interface (API) calls from users upon launching the service. A spike in number of API calls may have led to a failure during training. The computing system (104) may determine an occurrence of failure when there is a spike in the number of API calls from data stored in the failure and maintenance history repository ($201_1$). Hence, the computing system (104) may receive frequency distribution of the API calls to analyse occurrence of the failure. The frequency distribution of the API calls provides number of API calls per the API. The number of API calls is shown as counts in y-axis. The APIs are shown in x-axis.

Referring back to FIG. 5, at step (502), segregating, by the computing system (104), the one or more error logs from the plurality of system logs. The computing system (104) may segregate the one or more error logs from the plurality of system logs. The computing system (104) may parse the plurality of system logs into a structured data sequence. The computing system (104) may parse each piece of alphanumeric data within each system log into a number/sequence of tokens using a defined set of delimiters. The delimiters may be spaces, equal signs, colons, semicolons, and the like. The computing system (104) may identify the one or more error logs of each VDI system from plurality of system logs using possible failure pinpoints information from the VDI data repository (201). The VDI data repository (201) may comprise the plurality of training error logs which are labelled as normal and abnormal. The error logs labelled as abnormal may represent the possible failure pinpoints information which may be used to identify the one or more error logs in real-time. The errors from standard operational events may be identified based on lexical analysis model comparing the structured data sequence with the VDI data repository (201) comprising the plurality of training error logs. Further, the computing system (104) may aggregate the one or more error logs in a time-sequence format based on a timestamp associated with the one or more error logs. For example, the terms like 'unavailable', 'error', 'temporarily' 'disconnect' may be used to identify the one or more error logs.

At step (503), generating, by the computing system (104), a prediction score for each of the plurality of VDI systems ($102_1$, $102_2$, ..., $102_n$) based on respective one or more error logs, using a machine learning model. The prediction score of a VDI system ($102_1$) among the plurality of VDI systems ($102_1$, $102_2$, ..., $102_n$) is indicative of a possible failure in the VDI system ($102_1$). The computing system (104) may compare the one or more error logs with the VDI data repository (201) to generate the prediction score. The prediction score represents a probability of occurrence of the failure. For example, the prediction score may be generated on a scale 1-10. The prediction score 1 may indicate a least probability and the prediction score 10 may indicate a high probability. For example, a parameter of the one or more error logs with the prediction score 1 may be least likely to cause failure. Likewise, a parameter of the one or more error logs with the prediction score 10 may be most likely to cause failure. The probable failure occurrence time may be 3 months when the prediction score is 3. The probable failure occurrence time may be 1 week when the prediction score is 8 When the same error is reflected in all the VDI systems, root cause may be different, and the failure may be severe. The prediction score may be 1. The probable failure occurrence period may be two days. Further, the computing system (104) may compute the prediction score based on the value associated with the plurality of training error logs, during training the machine learning model. The prediction score may be generated first for the error log associated with a smaller value, so that the severe failures are predicted and mitigated in lesser time.

At step (504), predicting, by the computing system (104), the failure in at least one VDI system ($102_1$) from the plurality of VDI systems ($102_1, 102_2, \ldots, 102_n$) based on the prediction score of the at least one VDI system ($102_1$) and the respective one or more error logs using the trained machine learning model. The computing system (104) may determine the failure in the at least one VDI system ($102_1$) from the plurality of VDI systems ($102_1, 102_2, \ldots, 102_n$) based on the trained machine learning model. Further, the computing system (105) may determine the failure based on correlation between the one or more rules, the determined failure, and the plurality of feature vectors. The computing system (104) may utilize various machine learning techniques to learn relationships between data values and the change in the data values with respect to the historical failure values in order to predict future failures. The machine learning techniques may comprise regression, binary classification, and multi-class classification along with GANs (generative adversarial networks). Referring to the example in FIG. 6C, at step (601) the error may be "VDI system 1 is not responding" at time instance 12:00 AM. At step (602), the computing system (105) may determine if the error is due to a greater logon duration and no movement of cursor by a user. This error may necessarily not be a failure based on the one or more rules. At step (603), the computing system (104) may alert the user to move the cursor. At step (604), the computing system (105) may determine if the VDI system 2 is responding. The VDI systems may not be responding. During training, when all the VDI systems were not responding, the error was considered as failure. Failure of the VDI systems when all the VDI systems are not responding is a pattern. The pattern was stored during the training and the pattern was associated with the failure. Since similar pattern occurred in real-time, the computing system (104) retrieved the associated failure tag with the pattern and predicted the failure.

Referring back to FIG. 5, at step (505), determining, by the computing system (104), at least one response action associated with the predicted failure. The computing system (105) may classify the predicted failure to a problem from the list of the problems in the problem knowledge base ($201_5$). The computing system (105) may determine that a greater number of API calls leads to a failure during training. Referring to the example in FIG. 6C, the computing system (105) may analyse the frequency distribution of the API calls. At step (605), the computing system (105) may determine that the problem is number of API calls are greater than the threshold value due to the launching of the service based on stored data during training. Further, the computing system (104) may determine at least one response action associated with the problem based on a severity level of at least one of, the predicted failure and a root cause of the predicted failure. The root cause of the predicted failure may be greater number of API calls as determined from the stored data. (607) indicates a successful scenario. (608) indicates a scenario which leads to a failure. At step (606), the computing system (104) may determine the response action as to alert the administrator (105) about the increase in the number of API calls. The computing system (104) may determine the severity level of the predicted failure based on the VDI data repository. For example, the computing system (104) may determine time to mitigate failure from the failure and maintenance history repository ($201_1$). If the time to mitigate the failure is greater, then the failure may be associated with a higher severity level. Accordingly, the response action may be to inform the administrator (105) since the severity level is high. Further, the computing system (104) may determine the at least one response action based on the root cause of the predicted failure. The root cause may be determined based on one or more historical failure points. The response action may be different based on the root cause. For example, an application in a VDI system may be slow. The response action may be to restart the system. Further, different applications may be slow in different VDI systems. The applications being slow in all the VDI systems may be associated to server load during training. Hence, the root cause may be the server load. Accordingly, the response action may be an alert to the administrator (205). An association between the response action and the problem may be built by a domain expert and stored in the problem knowledge base ($201_5$). The machine learning model may determine the response action dynamically. For example, consider occurrence of two events. The two events may have corresponding response actions individually in the problem knowledge base ($201_5$). When the two events occur at same time in real-time, decision may be taken by the machine learning model and the response action may be determined. The machine learning model is trained for determining the response actions dynamically.

Computer System

Figure 7:
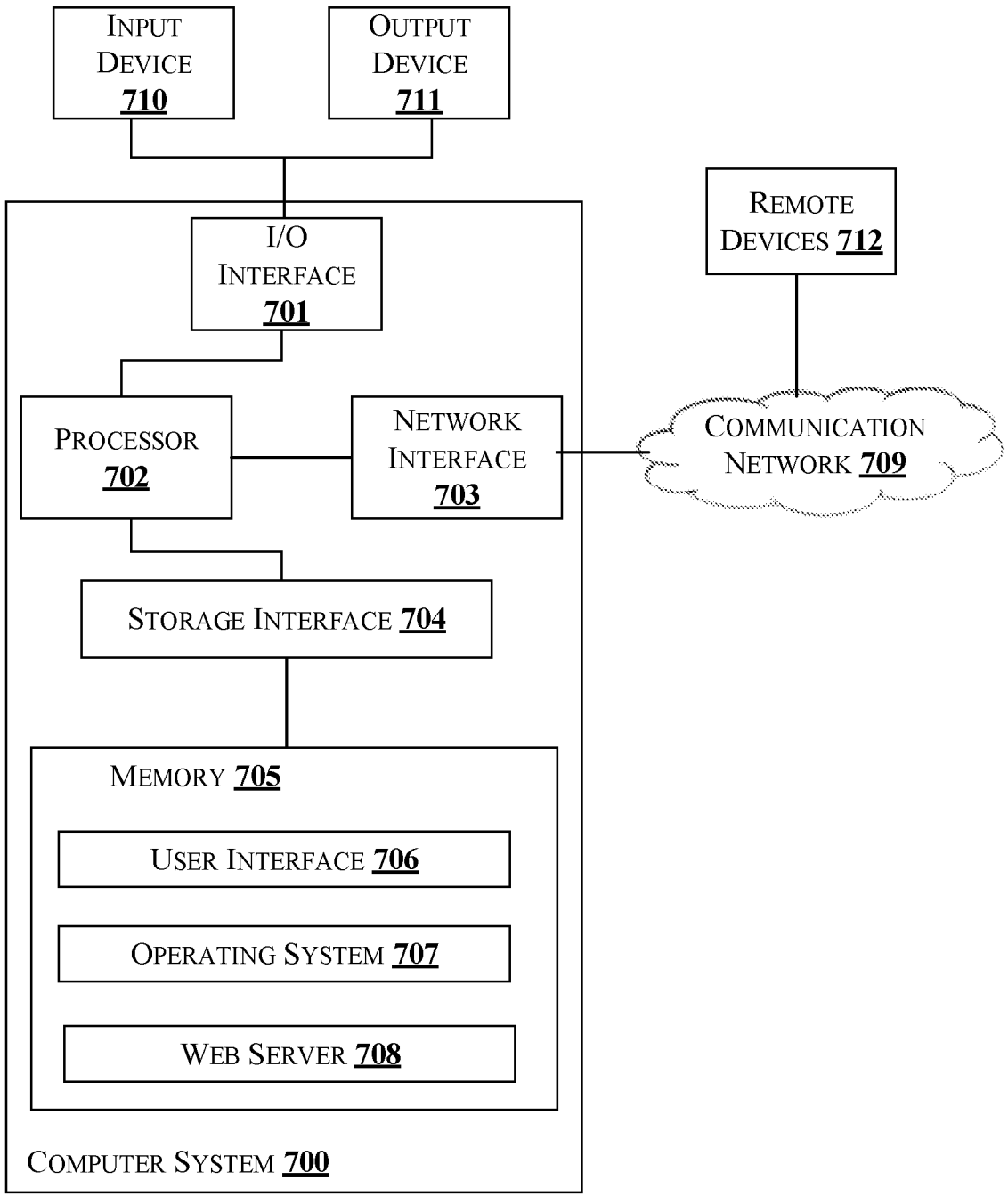
FIG. 7 shows a block diagram of a general-purpose computing system for predicting and mitigating failures in the VDI system, in accordance with embodiments of the present disclosure.

FIG. 7 illustrates a block diagram of an exemplary computer system (700) for implementing embodiments consistent with the present disclosure. In an embodiment, the computer system (700) is used for predicting and mitigating failures in a Virtual Desktop Infrastructure (VDI) system. The computer system (700) may comprise a Central Processing Unit ("CPU" or "processor") (702). The processor (702) may comprise at least one data processor. The processor (702) may include specialized processing units such as integrated system (bus) controllers, memory management control units, floating point units, graphics processing units, digital signal processing units, etc.

The processor (702) may be disposed in communication with one or more input/output (I/O) devices (not shown) via I/O interface (701). The I/O interface (501) may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface (701), the computer system (700) may communicate with one or more I/O devices. For example, the input device (710) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device (711) may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system (700) is connected to the remote devices (712) through a communication network (709). The remote devices (712) may provide the user reviews to the computing network 700. The remote devices (712) may be host devices in an organization or a personal computer. The processor (702) may be disposed in communication with the communication network (709) via a network interface (703). The network interface (703) may communicate with the communication network (709). The network interface (703) may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network (709) may include, without limitation, a direct interconnection, local area network (LAN), wide area network (WAN), wireless network (e.g., using Wireless Application Protocol), the Internet, etc. The network interface (703) may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network (709) includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor (702) may be disposed in communication with a memory (705) (e.g., RAM, ROM, etc. not shown in FIG. 7) via a storage interface (704). The storage interface (704) may connect to memory (705) including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (705) may store a collection of program or database components, including, without limitation, user interface (706), an operating system (707), web server (708) etc. In some embodiments, computer system (700) may store user/application data, such as, the data, variables, records, etc., as described in this disclosure. Such databases may be implemented as fault-tolerant, relational, scalable, secure databases such as Oracle® or Sybase®.

The operating system (707) may facilitate resource management and operation of the computer system (500). Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XPM, VISTA™/7/8, 10 etc.), APPLER IOS™, GOOGLE® ANDROID™, BLACKBERRY® OS, or the like.

In some embodiments, the computer system (700) may implement a web browser (708) stored program component. The web browser (708) may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers (708) may utilize facilities such as AJAX™, DHTML™, ADOBE® FLASH™, JAVASCRIP™, JAVA™, Application Programming Interfaces (APIs), etc. In some embodiments, the computer system (500) may implement a mail server (not shown in Figure) stored program component. The mail server may be an Internet mail server such as Microsoft Exchange, or the like. The mail server may utilize facilities such as ASP™, ACTIVEX™, ANSI™ C++/C #, MICROSOFT®, .NET™, CGI SCRIFTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system (700) may implement a mail client stored program component. The mail client (not shown in Figure) may be a mail viewing application, such as APPLE® MAI™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

The conventional systems do not identify a root cause of the fault in the VDI systems. Further, the traditional techniques for fault preventions in the VDI systems provide a high number of false alerts. The traditional techniques include real-time monitoring of the failures in the VDI systems and lacks prediction of the failures. Therefore, there is a delay in the system while overcoming actual failures, which degrades the performance of the system. The present disclosure provides faster prediction methods for failures in the VDI systems in the VDI cloud in a proactive manner by aggregation and time sequencing of error logs of the plurality of VDI systems. The present disclosure reduces false alerts by classifying the problems based on their severity levels. The present disclosure provides more robust solutions because of handling simultaneous/concurrent processor execution (such as applying one or more machine learning models over the same input, simultaneously).

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 4 and 5 shows certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method for predicting and mitigating failures in Virtual Desktop Infrastructure (VDI) systems, the method comprising:
   receiving, by a computing system, a plurality of system logs from a plurality of VDI systems;
   segregating, by the computing system, one or more error logs from the plurality of system logs;
   generating, by the computing system, a prediction score for each of the plurality of VDI systems based on respective one or more error logs, using a machine learning model, wherein the prediction score of a VDI system among the plurality of VDI systems is indicative of a possible failure in the VDI system, wherein the machine learning model is trained by performing steps of:
      receiving a plurality of feature vectors associated with a plurality of training error logs and one or more rules; and
      determining a failure in the plurality of VDI systems and a value associated with the plurality of training error logs, based on the plurality of feature vectors and the one or more rules;
         determining a correlation between the one or more rules, the determined failure and the plurality of feature vectors to train the machine learning model;
      wherein the trained machine learning model is used to predict failures in the plurality of VDI systems in real-time;
   predicting, by the computing system, a failure in at least one VDI system from the plurality of VDI systems based on the prediction score of the at least one VDI system and the respective one or more error logs using the trained machine learning model; and
   determining, by the computing system, at least one response action associated with the predicted failure, thereby mitigating the failure in the plurality of VDI systems.

2. The method of claim 1, wherein segregating the one or more error logs from the plurality of system logs comprises:
   parsing the plurality of system logs into a structured data sequence;
   identifying the one or more error logs by comparing the structured data sequence with a VDI data repository comprising the plurality of training error logs;
   segregating the one or more error logs from the plurality of system logs.

3. The method of claim 1, wherein the one or more error logs is aggregated in a time-sequence format based on a timestamp associated with the one or more error logs.

4. The method of claim 1, wherein generating the prediction score comprises:
   comparing the one or more error logs with a VDI data repository based at least on a plurality of predetermined thresholds;
   generating the prediction score based on the comparison.

5. The method of claim 4, wherein the prediction score represents a probability of occurrence of the failure.

6. The method of claim 1, wherein the training further comprises providing state data of software services and hardware assets associated with the plurality of VDI systems.

7. The method of claim 1, wherein the at least one response action associated with the predicted failure is determined from a plurality of response actions in a VDI data repository.

8. The method of claim 1, wherein the at least one response action is based on a severity level of at least one of, the predicted failure and a root cause of the predicted failure.

9. The method of claim 8, wherein the root cause of the predicted failure is determined based on one or more historical failure points.

10. A computing system for predicting and mitigating failures in Virtual Desktop Infrastructure (VDI) systems, the computing system comprising:
one or more processors; and
a memory, wherein the memory stores processor-executable instructions, which, on execution, cause the one or more processors to:
receive a plurality of system logs from a plurality of VDI systems;
segregate one or more error logs from the plurality of system logs;
generate a prediction score for each of the plurality of VDI systems based on respective one or more error logs, using a machine learning model, wherein the prediction score of a VDI system among the plurality of VDI systems is indicative of a possible failure in the VDI system, wherein the machine learning model is trained by performing steps of:
receiving a plurality of feature vectors associated with a plurality of training error logs and one or more rules; and
determining a failure and a value associated with the plurality of training error logs in the plurality of VDI systems, based on the plurality of feature vectors and the one or more rules;
determining a correlation between the one or more rules, the determined failure and the plurality of feature vectors to train the machine learning model;
wherein the trained machine learning model is used to predict failures in the plurality of VDI systems in real-time;
predict a failure in at least one VDI system from the plurality of VDI systems based on the prediction score of the at least one VDI system and the respective one or more error logs using the trained machine learning model; and
determine at least one response action associated with the predicted failure, thereby mitigating the failure in the plurality of VDI systems.

11. The computing system of claim 10, wherein the one or more processors segregates the one or more error logs from the plurality of system logs by:
parsing the plurality of system logs into a structured data sequence;
identifying the one or more error logs by comparing the structured data sequence with a VDI data repository comprising the plurality of training error logs;
segregating the one or more error logs from the plurality of system logs.

12. The computing system of claim 10, wherein the one or more processors aggregates the one or more error logs in a time-sequence format based on a timestamp associated with the one or more error logs.

13. The computing system of claim 10, wherein the one or more processors generates the prediction score by:
comparing the one or more error logs with a VDI data repository based at least on a plurality of predetermined thresholds;
generating the prediction score based on the comparison.

14. The computing system of claim 10, wherein the training further comprises providing state data of software services and hardware assets associated with the plurality of VDI systems.

15. The computing system of claim 10, wherein the one or more processors determines the at least one response action associated with the predicted failure from a plurality of response actions in a VDI data repository.

16. The computing system of claim 10, wherein the at least one response action is based on a severity level of at least one of, the predicted failure and a root cause of the predicted failure.

17. The computing system of claim 16, wherein the root cause of the predicted failure is determined based on one or more historical failure points.

18. A non-transitory computer readable medium including instructions stored thereon that when processed by one or more processors, wherein the instructions cause a computing system to:
receive a plurality of system logs from a plurality of VDI systems;
segregate one or more error logs from the plurality of system logs;
generate a prediction score for each of the plurality of VDI systems based on respective one or more error logs, using a machine learning model, wherein the prediction score of a VDI system among the plurality of VDI systems is indicative of a possible failure in the VDI system, wherein the machine learning model is trained by performing steps of:
receiving a plurality of feature vectors associated with a plurality of training error logs and one or more rules; and
determining a failure and a value associated with the plurality of training error logs in the plurality of VDI systems, based on the plurality of feature vectors and the one or more rules;
determining a correlation between the one or more rules, the determined failure and the plurality of feature vectors to train the machine learning model;
wherein the trained machine learning model is used to predict failures in the plurality of VDI systems in real-time;
predict a failure in at least one VDI system from the plurality of VDI systems based on the prediction score of the at least one VDI system and the respective one or more error logs using the trained machine learning model; and
determine at least one response action associated with the predicted failure, thereby mitigating the failure in the plurality of VDI systems.

19. The medium of claim 18, wherein the one or more processors segregates the one or more error logs from the plurality of system logs by:
parsing the plurality of system logs into a structured data sequence;
identifying the one or more error logs by comparing the structured data sequence with a VDI data repository comprising the plurality of training error logs;
segregating the one or more error logs from the plurality of system logs.

20. The medium of claim 18, wherein the one or more processors aggregates the one or more error logs in a time-sequence format based on a timestamp associated with the one or more error logs.

21. The medium of claim 18, wherein the one or more processors generates the prediction score by:

comparing the one or more error logs with a VDI data repository based at least on a plurality of predetermined thresholds;

generating the prediction score based on the comparison.

22. The medium of claim 18, wherein the training further comprises providing state data of software services and hardware assets associated with the plurality of VDI systems.

23. The medium of claim 18, wherein the one or more processors determines the at least one response action associated with the predicted failure from a plurality of response actions in a VDI data repository.

24. The medium of claim 18, wherein the at least one response action is based on a severity level of at least one of, the predicted failure and a root cause of the predicted failure.

25. The medium of claim 24, wherein the root cause of the predicted failure is determined based on one or more historical failure points.

\* \* \* \* \*